(12) United States Patent
Ueno et al.

(10) Patent No.: US 6,563,288 B2
(45) Date of Patent: May 13, 2003

(54) CONTROL DEVICE FOR FUEL CELL POWERED VEHICLE

(75) Inventors: Munetoshi Ueno, Ebina (JP); Shinichi Deguchi, Fujisawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/034,256

(22) Filed: Jan. 3, 2002

(65) Prior Publication Data

US 2002/0097020 A1 Jul. 25, 2002

(30) Foreign Application Priority Data

Jan. 19, 2001 (JP) .......................... 2001-010917

(51) Int. Cl.⁷ .............................. H02P 11/00; H02J 7/00
(52) U.S. Cl. ........................ 318/783; 318/805; 318/808; 320/104
(58) Field of Search ................. 318/783, 808, 318/805; 320/104

(56) References Cited

U.S. PATENT DOCUMENTS

| | | | |
|---|---|---|---|
| 3,774,676 A | * 11/1973 | Franz | .................... 165/204 |
| 5,350,992 A | * 9/1994 | Colter | .................... 318/805 |
| 5,760,486 A | * 6/1998 | Uchinami et al. | ......... 290/40 C |
| 5,896,487 A | * 4/1999 | Masten et al. | ............... 318/254 |
| 5,929,594 A | * 7/1999 | Nonobe et al. | ............. 320/104 |
| 5,950,752 A | * 9/1999 | Lyons | ........................ 165/41 |
| 6,159,626 A | * 12/2000 | Keskula et al. | ............... 429/12 |

FOREIGN PATENT DOCUMENTS

| | | | | |
|---|---|---|---|---|
| CA | 1 084 895 A1 | * 3/2001 | ........... B60L/15/20 |
| JP | 9-191582 | 7/1997 | |
| JP | 11-220812 | 8/1999 | |

* cited by examiner

Primary Examiner—Rita Leykin
(74) Attorney, Agent, or Firm—Foley & Lardner

(57) ABSTRACT

A fuel cell power plant (1) and a rechargeable battery (2) are connected in parallel to an electric motor (3) of a fuel cell powered vehicle, and the output voltage of the fuel cell power plant (1) is regulated by a converter (4). A temperature sensor (5) detects the temperature of the electric motor (3), and a controller (6) controlling the output voltage of the converter (4) to a predetermined high voltage value when the temperature of the electric motor (3) is greater than a predetermined temperature, thereby preventing the excessive rise of the temperature of the electric motor (3).

18 Claims, 9 Drawing Sheets

# CONTROL DEVICE FOR FUEL CELL POWERED VEHICLE

FIELD OF THE INVENTION

This invention relates to a control device for a vehicle which is powered by a fuel cell.

BACKGROUND OF THE INVENTION

With regard to an electric vehicle which is propelled by the operation of an electric motor, Tokkai Hei 9-191582 published by the Japanese Patent Office in 1997 discloses a system which performs output limitation of the direct current (DC) power supply in order to prevent increase in the temperature of the electric motor. Reduction of the input voltage of the electric motor leads to elevation of its temperature, and to increase in the heat loss in the motor. This prior art reduces the output of the DC power supply in such a case, so as to decrease the input current to the electric motor.

Tokkai Hei 11-220812 published by the Japanese Patent Office in 1999 discloses an electric system which enhances the operational efficiency of the electric motor by keeping the input voltage to the electric motor at a constant potential level by output voltage control of the DC power supply.

SUMMARY OF THE INVENTION

In connection with the former art, limitation of the output of the DC power supply amounts to a limitation of the output of the electric motor, and as a result the power performance of the vehicle is reduced.

In connection with the latter art, the following problem arises in the case of application to a fuel cell powered vehicle.

For a fuel cell vehicle in which the fuel cell device and a rechargeable battery are connected in parallel to the electric motor, it is desirable to control the output of the fuel cell device at high efficiency in order to balance the charge amount and discharge amount of the rechargeable battery. However, keeping the input voltage to the electric motor at a constant potential level makes this kind of control difficult, and risks increasing the fuel consumption of the vehicle.

It is therefore an object of this invention to prevent excessive rise of the temperature of the electric motor used for a fuel cell vehicle, while restraining increase in the fuel consumption of the fuel cell power plant.

In order to achieve the above object, this invention provides a control device for fuel cell powered vehicle which is driven by an electric motor to which a fuel cell power plant and a rechargeable battery are electrically connected in parallel. The device comprises a converter which converts an output voltage of one of the fuel cell power plant and the rechargeable battery, a temperature sensor which detects a temperature of the electric motor, and a programmable controller programmed to control an output voltage of the converter according to the temperature of the electric motor.

This invention also provides a control method for a fuel cell powered vehicle which is driven by an electric motor to which a fuel cell power plant and a rechargeable battery are electrically connected in parallel. The method comprises detecting a temperature of the electric motor, and converting an output voltage of one of the fuel cell power plant and the rechargeable battery according to the temperature of the electric motor.

The details as well as other features and advantages of this invention are set forth in the remainder of the specification and are shown in the accompanying drawings.

DESCRIPTION OF THE PREFERRED EMBODIMENTS

Figure 1:
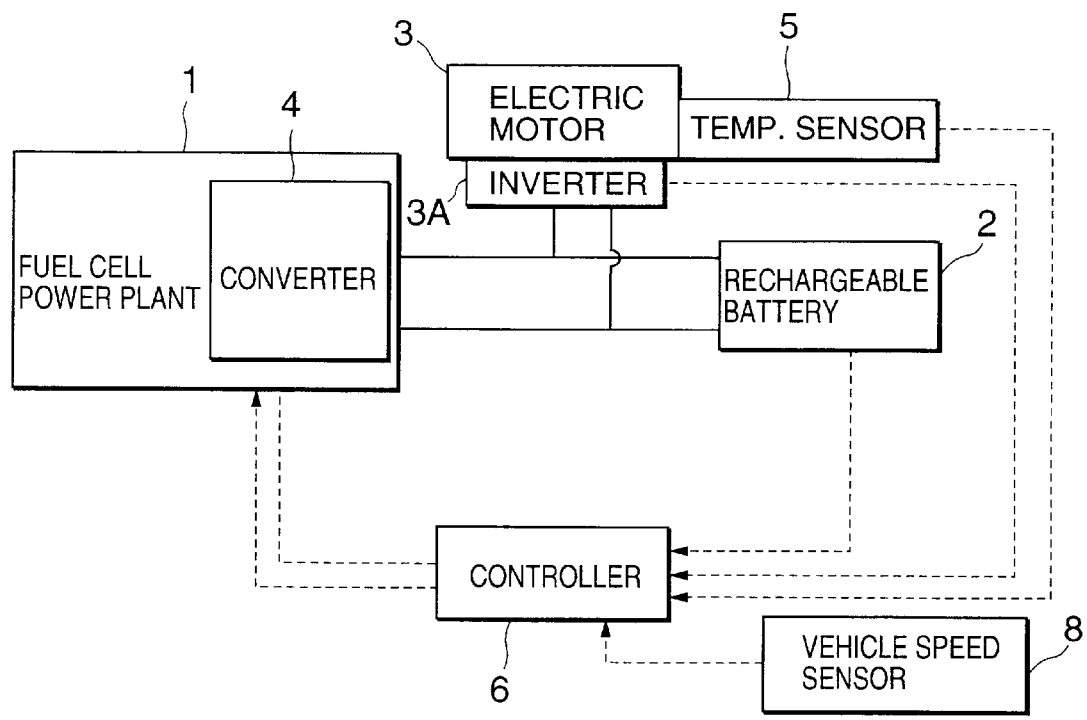
FIG. 1 is a schematic diagram of a control device for a fuel cell powered vehicle according to this invention.

Referring to FIG. 1 of the drawings, a fuel cell powered vehicle comprises an electric motor 3 which provides its motive power, a fuel cell power plant 1 which comprises a fuel cell stack for supplying electrical power to the electric motor 3, and a rechargeable battery 2. The fuel cell power plant 1 comprises a fuel cell which generates electrical power by utilizing hydrogen.

In this embodiment, a 20 kilowatt (KW) three phase synchronous alternating current (AC) motor is used as the electric motor 3. This electric motor 3 comprises an inverter 3A.

The fuel cell device 1 and the rechargeable battery 2 are connected to the inverter 3A in parallel, as shown in the figure by solid lines.

The inverter 3A converts the direct current (DC) which is supplied from this parallel power supply circuit into three phase alternating current (AC), which it supplies to the electric motor 3. The electric motor 3 is rotated by this three phase alternating current, and drives the drive wheels of the vehicle. On the other hand, when the vehicle is decelerating, the rotational energy of the drive wheels regenerates electrical energy by driving the electric motor 3 as a generator, so as to charge the rechargeable battery 2.

The fuel cell power plant supplies drive current to the electric motor 1. Moreover, when the voltage of the rechargeable battery 2 has dropped due to lack of charge, the fuel cell power plant supplies current to this rechargeable battery 2 for charging it.

A converter 4 is provided to the fuel cell power plant 1 for increasing its output voltage. This converter 4 is a so-called DC—DC converter, and increases the output voltage of the fuel cell power plant 1 according to a signal which is output from the controller 6.

For controlling the output voltage of the fuel cell power plant 1, a temperature sensor 5 which detects the temperature of the electric motor 3 and a vehicle speed sensor 8 which detects the vehicle speed are connected to the controller 6 by a signal circuit shown by the broken lines in the figure.

The temperature sensor 5 detects the temperature of a coil which is provided to the electric motor 3, or the temperature of coolant which cools the electric motor 3.

Furthermore, a signal from the rechargeable battery 2 which indicates its output voltage and a signal from the inverter 3A of the electric motor 3 which indicates the motor load are input to the controller 6.

Based upon these signals, the controller 6 controls the converter 4 so as to control the output voltage of the fuel cell power plant 1.

Figure 2:
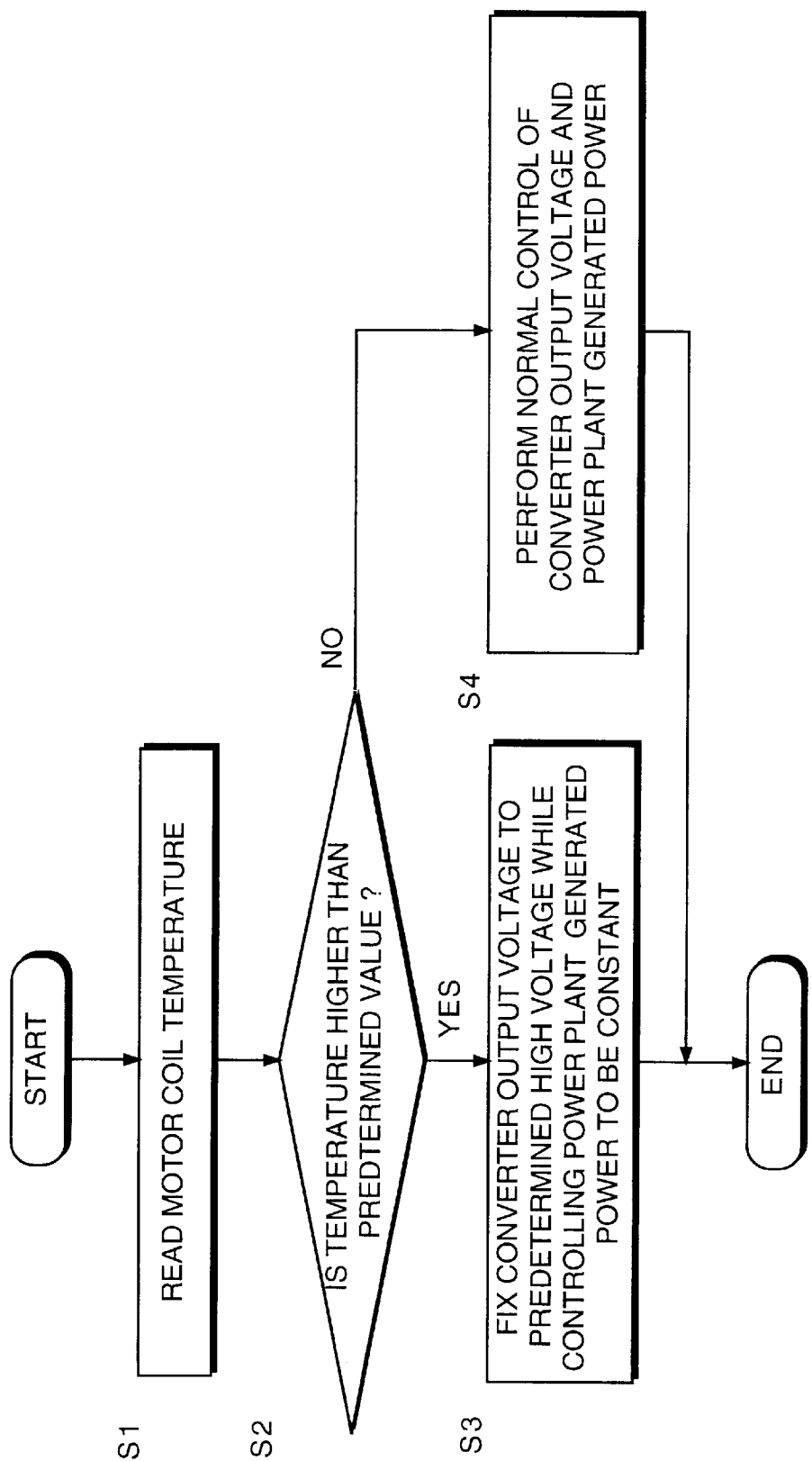
FIG. 2 is a flow chart for explanation of a control routine for the output voltage of a fuel cell power plant, which is executed by a controller according to this invention.

For this control, the controller 6 executes a routine shown in FIG. 2 at periodic intervals while the electric motor 3 is operating. The execution period may be, for example, one second.

Referring to FIG. 2, first in a step S1, the controller 6 reads the motor temperature as detected by the temperature sensor 5.

Next, in a step S2, the controller 6 compares this motor temperature with a predetermined temperature. This predetermined temperature may be set to a coil temperature of a hundred degrees centigrade (100° C.). If the motor temperature is greater than the predetermined temperature, the routine proceeds to a step S3.

In this step S3, the controller 6 controls the output voltage of the fuel cell power plant 1 to a predetermined high voltage value by outputting a signal to the converter 4.

Now, this predetermined high voltage value will be explained.

Figure 3:
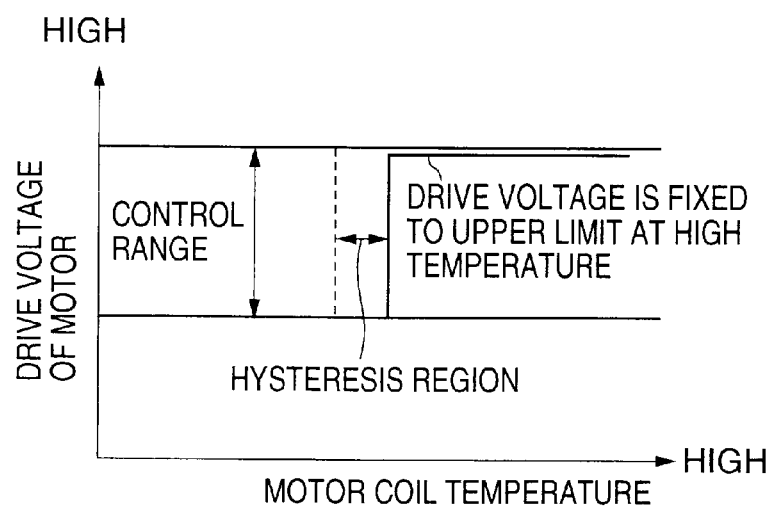
FIG. 3 is a diagram showing a relationship between the coil temperature of an electric motor and a set voltage defined by the controller.

FIG. 3 shows the control range for the drive voltage for the electric motor 3. The predetermined high voltage value which is applied in the step S3 is set to be equal to the upper limit of this control range.

For the 20 KW electric motor 3 used in this embodiment for driving the vehicle, the control range is 70 volts to 140 volts. Accordingly, in the step S3, the controller 6 controls the converter 4 so that the output voltage of the fuel cell power plant is equal to 140 volts. The output power of the fuel cell power plant 1 is maintained at a constant level which allows this voltage to be attained.

Figure 7:
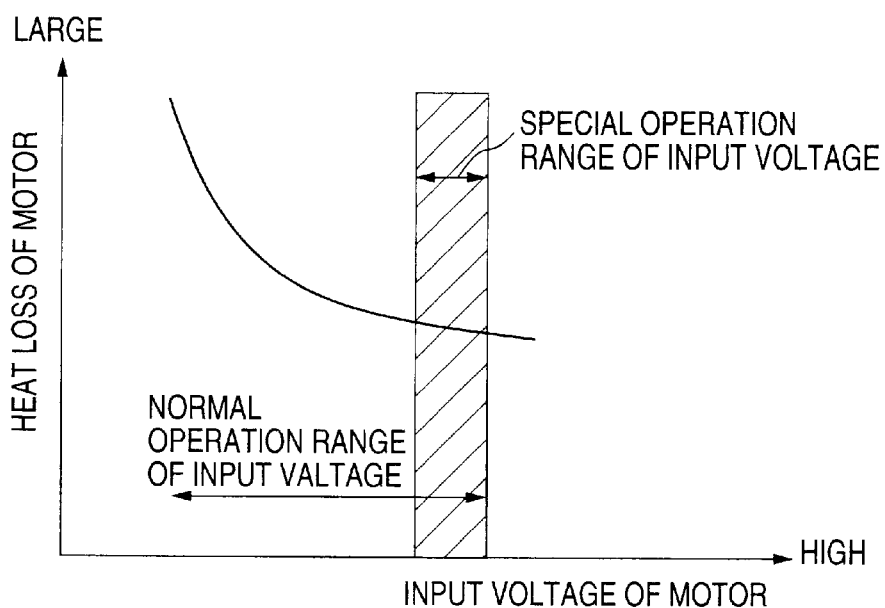
FIG. 7 is a diagram for explanation of a relationship between input voltage to the electric motor and heat loss in the motor.

Referring to FIG. 7, the heat loss rate of the electric motor 3 increases along with decrease of its input voltage. Thus, if the motor temperature is greater than the predetermined temperature, the output voltage of the fuel cell device 1 is maintained at the upper limit of the control range, in order to ensure that the heat loss rate of the motor 3 is small.

As a result efficient vehicle operation is attained, based upon low heat loss rate of the electric motor 3. If the open circuit voltage of the rechargeable battery 2 drops to lower than the upper limit of the control range, in addition to the supply of drive current from the fuel cell device 1 to the electric motor 3, current is also supplied to the rechargeable battery 2, and thus the rechargeable battery 2 is charged.

After the procedure of the step S3, the routine terminates.

If in the step S2 it is determined that the motor temperature is not greater than the predetermined temperature value, the routine proceeds to a step S4. In this step S4, the controller 6 performs normal control in the above described control range. This control is performed for the purpose of maximizing the operational efficiency of the fuel cell power plant 1.

At this time, if it is possible for the power which is currently required by the electric motor 3 to be supplied solely from the fuel cell power plant 1, then the controller 6 controls the converter 4 so that it raises its output voltage higher than the open circuit voltage of the rechargeable battery 2.

If on the other hand it is not possible for the power which is currently required by the electric motor 3 to be supplied solely from the fuel cell power plant 1, then the controller 6 controls the converter 4 so that its output voltage is equal to the open circuit voltage of the rechargeable battery 2, so that electrical power is supplied to the electric motor 3 both from the fuel cell power plant 1 and also from the rechargeable battery 2.

In parallel with controlling the output voltage of the converter 4, the controller 6 also controls the level of power generation of the fuel cell power plant 1 in the following manner.

Referring to FIG. 7, the power generation level for the fuel cell power plant 1 shown by the straight line in this figure is the level for which the efficiency is the highest. The curved line shows the variation of the electrical power requirement as the load upon the electric motor 3 changes.

When a power requirement which varies in this manner exceeds the power generation capacity of the fuel cell power plant 1, power is supplied from the rechargeable battery 2 to the electric motor 3 in order to satisfy the power requirement. Conversely, in the regions shown in the figure by diagonal hatching, the power requirement is less that the power generation capacity of the fuel cell power plant In this case, the surplus electrical power is used for charging the rechargeable battery 2. The most suitable operational efficiency for the fuel cell power plant 1 is that at which its power generation level is maintained so that the power supplied by the rechargeable battery 2 is equal to the electrical power used for charging the rechargeable battery 2.

To put it in another way, the power generation level of the fuel cell power plant 1 should be so adjusted that, in FIG. 7, the total area of the regions delimited by the required power curve below the straight line which shows the power generation level, in other words, the total area of the regions shown by the diagonal hatching, and the total area of the regions delimited by the required power curve above the straight line, should be equal to one another.

Such adjustment of the power generation level of the fuel cell power plant 1 is performed by adjusting the amount of fuel which is supplied to the fuel cell power plant 1. In other words, in the case of a fuel cell power plant which is associated with a reformation device, the level of power generation is adjusted by adjusting the amount of fuel supplied for reformation; and, in the case of a fuel cell power plant which is not associated with any reformation device, the level of power generation is adjusted by adjusting the amount of hydrogen supplied.

After the procedure of the step S4, the routine terminates.

By this control, it is possible to suppress increase of the temperature of the electric motor 3 without limiting its power output. Furthermore, if the temperature of the electric motor 3 is below the predetermined temperature, it is possible to prevent increase of the fuel consumption by the fuel cell power plant 1 by performing control in order to optimize the operational efficiency of the fuel cell power plant 1.

When performing the decision relating to the temperature of the electric motor 3 in the step S2, it is desirable to provide a hysteresis region as shown by the broken line in FIG. 3, although this concept is not shown in the flowchart of FIG. 2. In other words, for example, instead of setting the predetermined temperature at 100° C., a hysteresis region of width 10° C. around 100° C. is set.

When the temperature of the electric motor 3 rises, at the time point that the temperature of the electric motor 3 exceeds the upper limit of the hysteresis region, it is determined that the temperature of the electric motor 3 has exceeded the predetermined temperature. On the other hand, when the temperature of the electric motor 3 drops, at the time point that the temperature of the electric motor 3 drops below the lower limit of the hysteresis region, it is determined that the temperature of the electric motor 3 has dropped below the predetermined temperature.

The output voltage control of the fuel cell power plant 1 in the vicinity of the predetermined temperature is stabilized by setting a hysteresis region in this manner.

Furthermore, it would also be possible to add the vehicle speed detected by the vehicle speed sensor 8 as an additional condition for decision in the step S2. In other words the routine would only proceed from the step S2 to the step S3 if both the temperature of the electric motor 3 was higher than the certain predetermined temperature and also the vehicle speed was higher than a certain predetermined vehicle speed while on the other hand, if the vehicle speed was lower than the predetermined vehicle speed, the routine would proceed to the step S4, even if the temperature of the electric motor 3 was higher than the predetermined temperature.

The predetermined vehicle speed is set to a boundary speed between the low vehicle speed region and the medium to high vehicle speed region. Here, the low vehicle speed region corresponds to the speed region for driving in urban areas.

Generally, it is the medium to high vehicle speed region in which the electric motor 3 may overheat. In the low vehicle speed region, it is difficult for the temperature of the electric motor 3 to exceed the predetermined temperature, and even if it does do so, the level by which it so exceeds the predetermined temperature is likely to be small. Further, this excess condition is likely to terminate naturally within a short time period. When control for preventing rise of the temperature of the electric motor 3 is performed even in these type of circumstances, there is a possibility of the fuel consumption of the fuel cell power plant deteriorating instead.

By including a condition related to the vehicle speed in the decision criterion used in the step S2, this type of slight rise of the temperature of the electric motor 3 in the low vehicle speed region is excluded from the range of phenomena subjected to temperature rise suppression control. As a result, on the one hand heat loss in the electric motor 3 in the medium and high vehicle speed region is suppressed, while on the other hand it becomes possible to reduce the fuel consumption of the fuel cell power plant 1 in the low vehicle speed region.

Various changes are possible in the manner for setting the predetermined high voltage value, which is to be the target for control by the converter 4 in the step S3.

Figure 4:
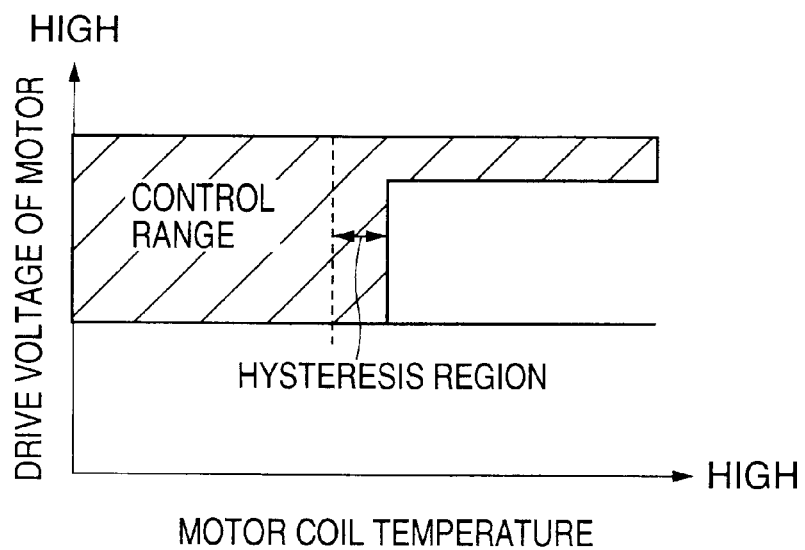
FIG. 4 is a diagram showing a possible variation related to the relationship between the electric motor coil temperature and the set voltage defined by the controller.

For example, as shown in FIG. 4, instead of fixing the predetermined high voltage value at the upper limit of the control range, it would also be possible to set a region of fixed width adjoining the upper limit of the control range. To speak in terms of the previously discussed 20 KW electric motor, instead of fixing the output voltage of the converter 4 to 140 volts which is the upper limit of the control range, it would be maintained in the region from 120 volts to 140 volts.

Figure 5:
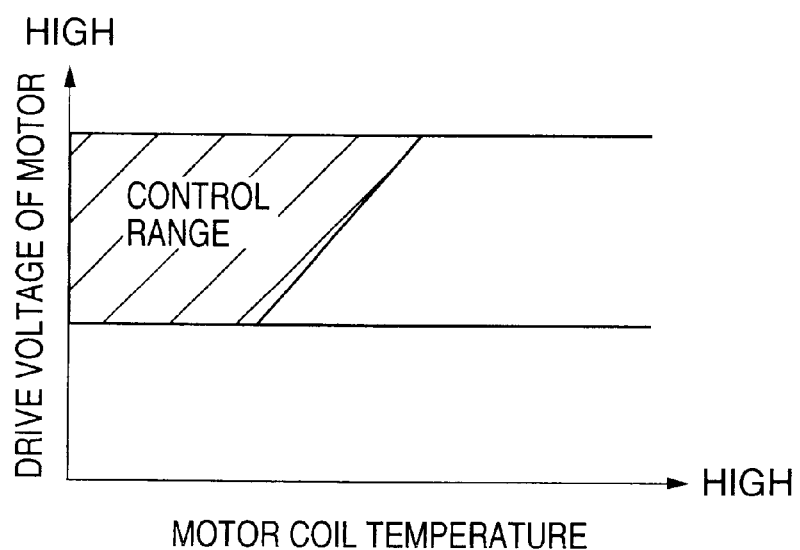
FIG. 5 is a diagram showing another variation related to the relationship between the electric motor coil temperature and the set voltage that can be defined by the controller.

Furthermore, by varying the predetermined high voltage value so that it becomes higher in the control range as the temperature detected by the temperature sensor 5 increases, as shown in FIG. 5, it is possible to further enhance the efficiency of temperature rise suppression control for the electric motor 3.

Although in this embodiment, the temperature sensor 5 detects the temperature of the electric motor 3 from the temperature of its coil or from the temperature of its coolant, it would be possible, as an alternative, further to enhance the accuracy of control by detecting both of these two temperatures individually by using a plurality of temperature sensors, by comparing the temperatures detected by these plural sensors against separately set predetermined temperatures, and by performing determination of the temperature of the electric motor 3 based upon the results of these comparisons.

Next, a second embodiment of this invention will be explained with reference to FIGS. 8 and 9.

Figure 8:
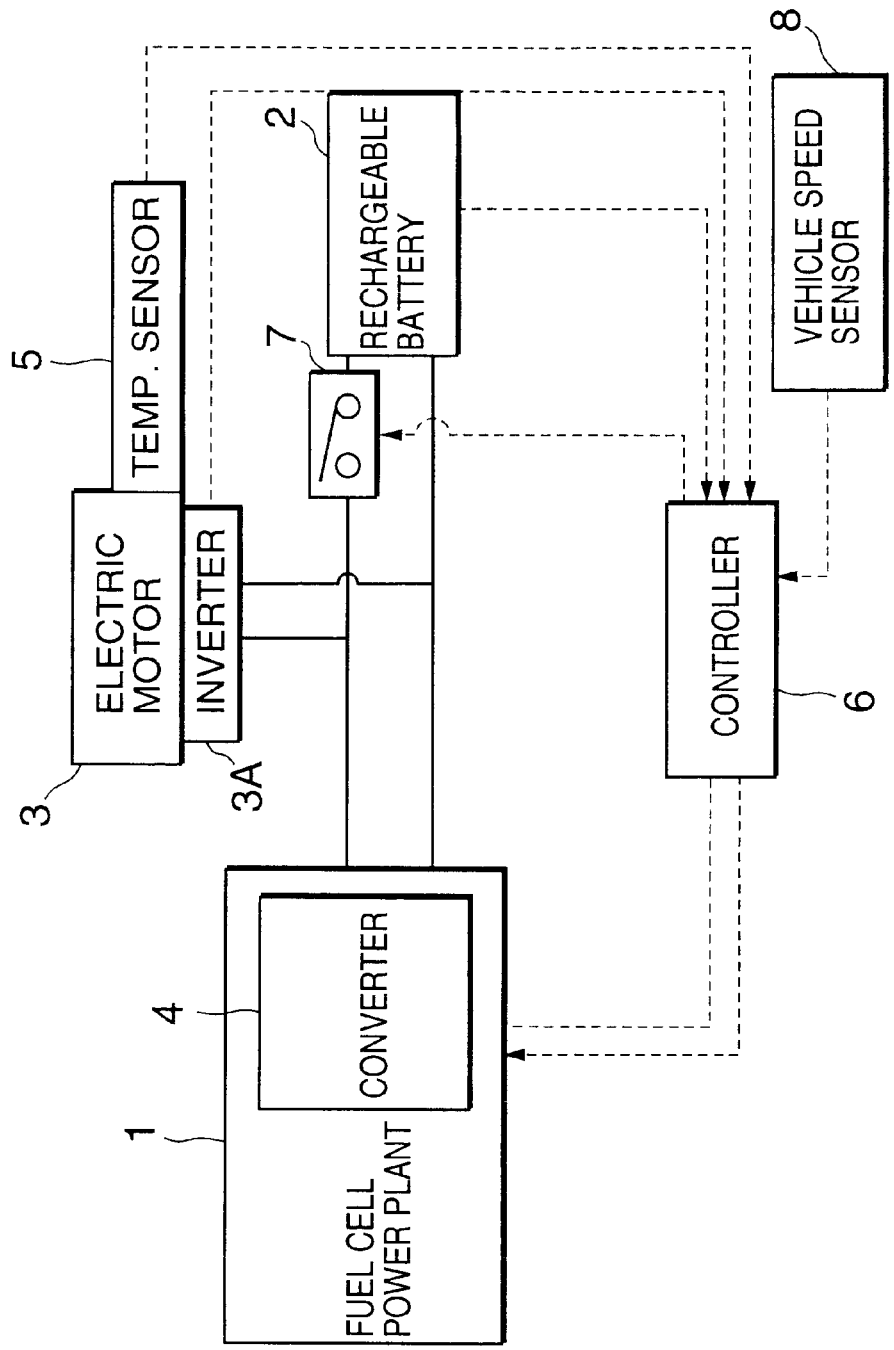
FIG. 8 is similar to FIG. 1 but showing a second embodiment of this invention.

In this second embodiment, in addition to the structure of the first embodiment described above, the control device is further provided with a switch 7 as shown in FIG. 8. The switch 7 is normally kept in an ON state where it electrically connects the rechargeable battery 2 with the electric motor 3 and fuel cell power plant 1. It turns to an OFF state upon receiving a signal from the controller 6 to interrupt the electrical connection therebetween. 1.

Figure 9:
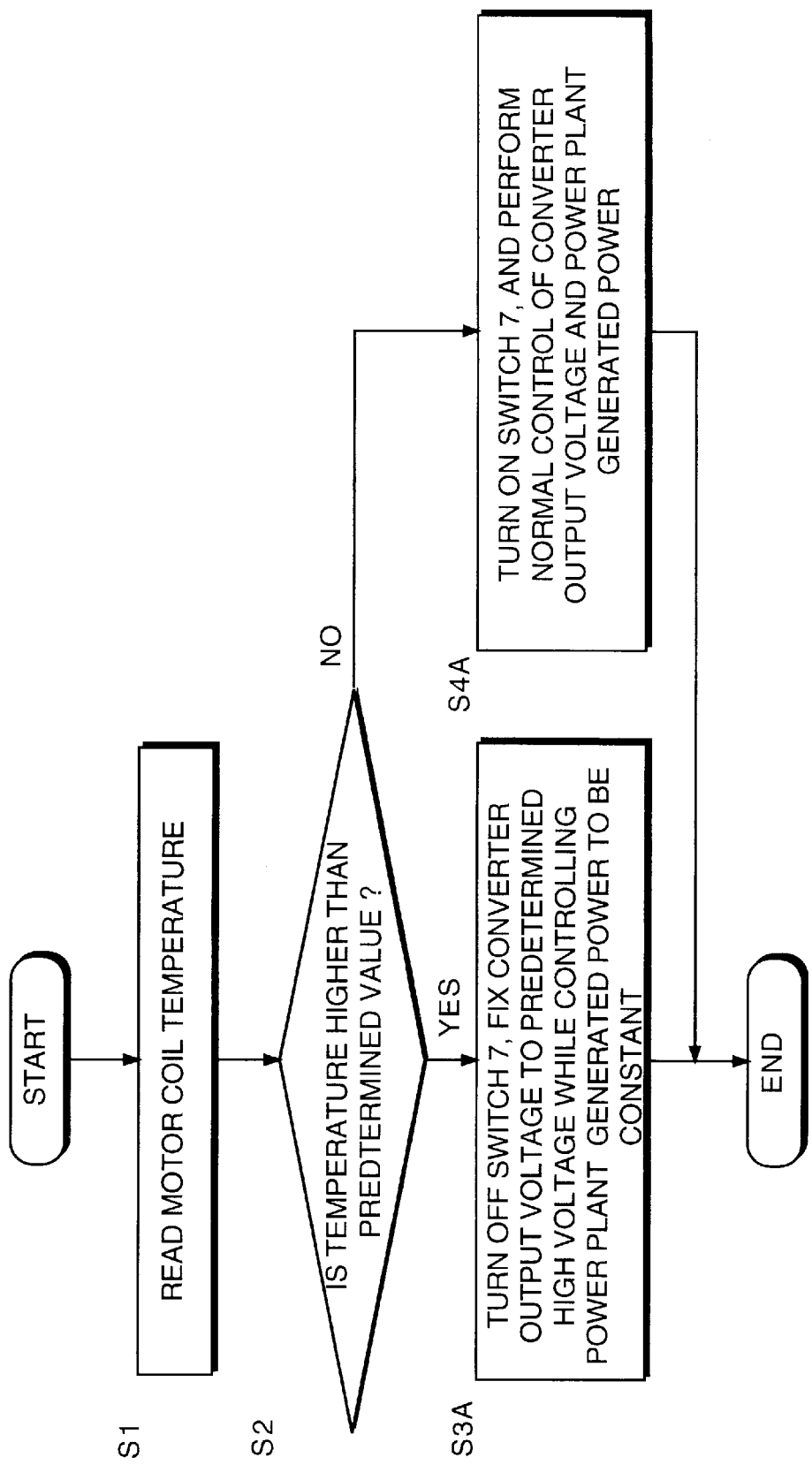
FIG. 9 is similar to FIG. 2 but showing the second embodiment of this invention.

Furthermore, as shown in FIG. 9, in the control routine, a step S3A is provided instead of the step S3 of the control routine of the first embodiment, and likewise a step S4A is provided instead of the step S4. In the step S3A, the controller turns the switch 7 OFF and controls the output voltage of the converter 4 to the predetermined high voltage value, in the same manner as in the step S3 described above. In the step S4A, along with turning the switch 7 ON, optimizing control of the operational efficiency of the fuel cell power plant 1 is performed in the same manner as in the step S4 described above.

According to this second embodiment, flow of electrical current to and from the rechargeable battery 2 is interrupted during the period in which control is being performed for suppressing elevation of the temperature of the electric motor 3.

Maintaining the output voltage of the converter 4 at the predetermined high voltage value leads to increase of the load upon the fuel cell power plant 1. If the switch 7 is turned OFF during the period in which control is being performed for suppressing elevation of the temperature of the electric motor 3, no charging electrical current is provided to the rechargeable battery 2 from the fuel cell power plant 1, even if the charge level of the rechargeable battery 2 drops.

Accordingly, with this second embodiment, it is possible to prevent the load upon the fuel cell power plant 1 from becoming excessively large during the period in which control is being performed for suppressing elevation of the temperature of the electric motor 3.

Various variations are possible with respect to the criteria of determining the predetermined temperature which is the basis for the decision in the step S2, and the predetermined high voltage value which is the control target during the control of the step S3A, in the same manner as in the case of the first embodiment.

Figure 10:
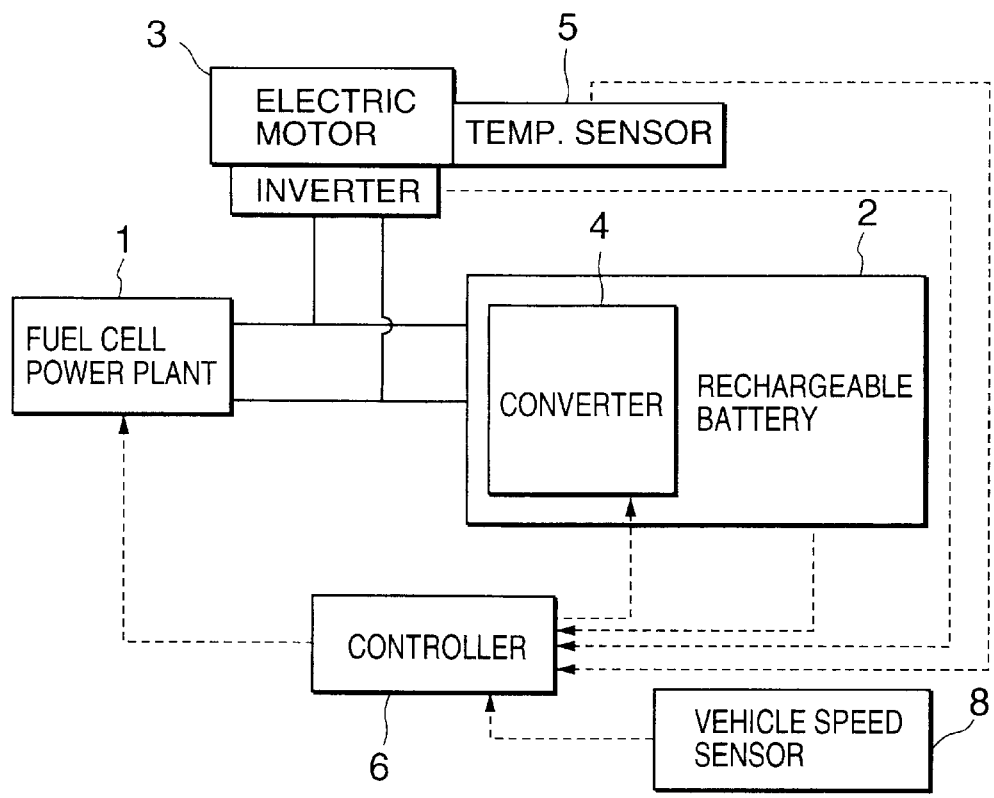
FIG. 10 is similar to FIG. 1 but showing a third embodiment of this invention.

Next, a third embodiment of this invention will be explained with reference to FIGS. 10 and 11.

According to this third embodiment, no converter 4 is provided to the fuel cell power plant 1, but instead a converter 4 is provided to the rechargeable battery 2. Accordingly the converter 4 regulates, not the output voltage of the fuel cell power plant 1, but instead the output voltage of the rechargeable battery 2.

Figure 11:
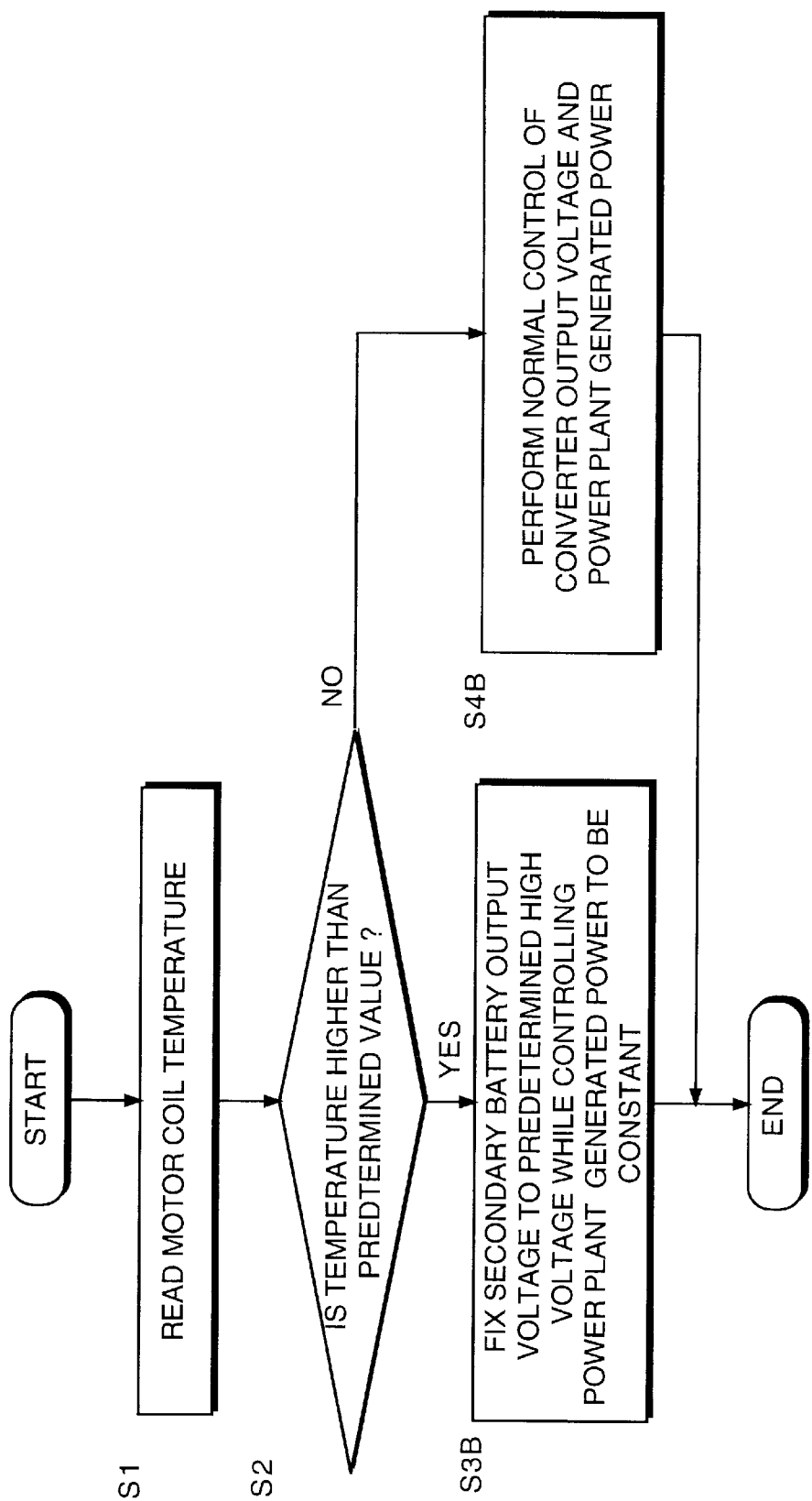
FIG. 11 is similar to FIG. 2 but showing the third embodiment of this invention.

Furthermore, as shown in FIG. 11, in the control routine, a step S3B is provided instead of the step S3 of the control routine of the first embodiment, and likewise a step S4B is provided instead of the step S4.

In the step S3B, not only is the output voltage of the converter 4 controlled to the predetermined high voltage value, but also the power generated by the fuel cell power plant 1 is fixed at a constant level which can provide the predetermined high voltage value. The fuel cell stack of the fuel cell power plant 1 has the characteristic that, the lower is the output power, the higher is the voltage which it can output. Accordingly, if the fuel cell power plant 1 is made to output a high voltage value corresponding to the output voltage of the converter 4, the power generated by the fuel cell power plant 1 is kept low. In this case, the shortage of power required by the electric motor 3 is supplied from the rechargeable battery 2.

If in the step S4B the power required by the electric motor 3 is smaller than the output power of the fuel cell power plant 1, the controller 6 controls the converter 4 so that its output voltage becomes lower than the output voltage of the fuel cell power plant 1. If the power required by the electric motor 3 is larger than the output power of the fuel cell power plant 1, the controller 6 controls the converter 4 so that the output voltage of the converter 4 becomes equal to the output voltage of the fuel cell power plant 1, thereby supplying electrical power to the electric motor 3 both from the fuel cell power plant 1 and from the rechargeable battery 2.

Figure 6:
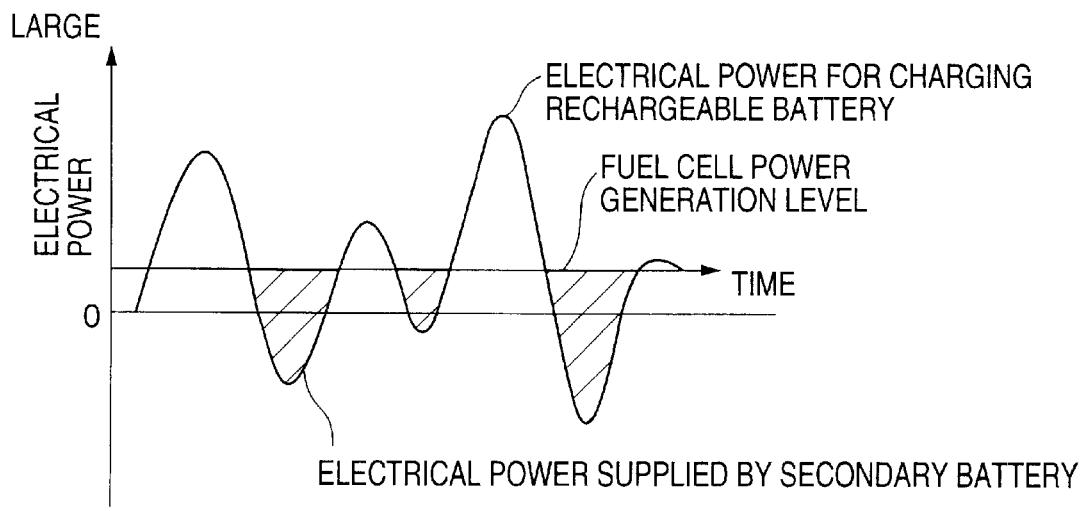
FIG. 6 is a diagram showing the variation of the output voltage of the fuel cell power plant when the plant is operating with the highest efficiency.

In parallel with the output voltage control of the converter 4, the controller 6 controls the power generated by the fuel cell power plant 1 so as to satisfy the relationship shown in FIG. 6.

According to this third embodiment, the power generated by the fuel cell power plant 1 is not increased during the period for temperature elevation suppression control of the electric motor 3. Accordingly, it is possible to prevent reduction of the load upon the fuel cell power plant 1 in accompaniment with temperature elevation suppression control of the electric motor 3.

In this third embodiment as well, various variations are possible with respect to the criteria for determining the predetermined temperature which is the basis for the decision in the step S2, and the predetermined high voltage value which is the control target during the control of the step S3B, in the same manner as in the case of the first embodiment.

The contents of Tokugan 2001-10917, with a filing date of Jan. 19, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A control device for a fuel cell powered vehicle which is driven by an electric motor to which a fuel cell power plant and a rechargeable battery are electrically connected in parallel via an inverter which regulates an electric power supplied to the motor, comprising:
   a converter which converts an output voltage of one of the fuel cell power plant and the rechargeable battery;
   a temperature sensor which detects a temperature of the electric motor; and
   a programmable controller programmed to control an output voltage of the converter according to the temperature of the electric motor.

2. The control device as defined in claim 1, wherein the converter is a converter which converts the output voltage of the fuel cell power plant.

3. The control device as defined in claim 1, wherein the converter is a converter which converts the output voltage of the rechargeable battery.

4. The control device as defined in claim 1, wherein the controller is further programmed to determine whether or not the temperature of the electric motor is greater than a predetermined temperature, and, when the temperature of the electric motor is greater than the predetermined temperature, to control the output voltage of the converter not to drop below a predetermined voltage.

5. The control device as defined in claim 4, wherein the controller is further programmed to control the output electrical power of the fuel cell power plant to cause an electrical power supplied from the rechargeable battery to the electric motor to balance an electrical power supplied from the fuel cell power plant to the rechargeable battery, when the temperature of the electric motor is not greater than the predetermined temperature.

6. The control device as defined in claim 4, wherein the predetermined voltage is set to a value in a predetermined voltage range of which an upper limit coincides with an upper limit of a drive current voltage of the electric motor.

7. The control device as defined in claim 4, wherein the predetermined voltage is set to be equal to the upper limit of the drive current voltage of the electric motor.

8. The control device as defined in claim 4, wherein the device further comprises a vehicle speed sensor which detects a vehicle speed, and the controller is further programmed to set the predetermined voltage to be a larger value as the vehicle speed increases.

9. The control device as defined in claim 4, wherein the device further comprises a switch which electrically disconnects the rechargeable battery with the fuel cell power plant and the electric motor in an OFF state, and the controller is further programmed to turn the switch to the OFF state when the temperature of the electric motor is greater than the predetermined temperature.

10. The control device as defined in claim 1, wherein the temperature sensor comprises one of a sensor which detects a temperature of a coil with which the electric motor is provided and a sensor which detects a temperature of coolant which cools the electric motor.

11. A control device for a fuel cell powered vehicle which is driven by an electric motor to which a fuel cell power plant and a rechargeable battery are electrically connected in parallel via an inverter which regulates an electric power supplied to the motor, comprising:
   means for converting an output voltage of one of the fuel cell power plant and the rechargeable battery;

means for detecting a temperature of the electric motor; and means for controlling an output voltage of the converting means according to the temperature of the electric motor.

12. A control method for a fuel cell powered vehicle which is driven by an electric motor to which a fuel cell power plant and a rechargeable battery are electrically connected in parallel via an inverter which regulates an electric power supplied to the motor, comprising:

detecting a temperature of the electric motor; and converting an output voltage of one of the fuel cell power plant and the rechargeable battery according to the temperature of the electric motor.

13. The control device as defined in claim 1, wherein the programmable controller is programmed to control the output voltage of the converter independent of an output power supplied to the electric motor.

14. The control device as defined in claim 1, wherein the programmable controller is programmed to control the output voltage of the converter without changing an output power supplied to the electric motor.

15. The control device as defined in claim 11, wherein the means for controlling an output voltage of the converting means controls the output voltage of the converting means independent of an output power supplied to the electric motor.

16. The control device as defined in claim 11, wherein the means for controlling an output voltage of the converting means controls the output voltage of the converting means without changing an output power supplied to the electric motor.

17. The control method as defined in claim 12, further comprising:

supplying an output power to the electric motor independent of converting the output voltage of one of the fuel cell power plant and the rechargeable battery.

18. The control method as defined in claim 12, further comprising:

maintaining an output power supplied to the electric motor while converting an output voltage of one of the fuel cell power plant and the rechargeable battery.

* * * * *